O. B. HALL, 2d.
Hose-Coupling.

No. 216,736.  Patented June 24, 1879.

WITNESSES.
Geo. B. Haskell.
J. W. White

INVENTOR.
Osborn B. Hall 2d
By Eugene Humphrey
his Atty

UNITED STATES PATENT OFFICE.

OSBORN B. HALL, 2D, OF BOSTON, MASSACHUSETTS.

IMPROVEMENT IN HOSE-COUPLINGS.

Specification forming part of Letters Patent No. 216,736, dated June 24, 1879; application filed April 5, 1879.

*To all whom it may concern:*

Be it known that I, OSBORN B. HALL, 2d, of Boston, in the county of Suffolk and State of Massachusetts, have invented a new and useful Improved Hose-Coupling, which invention is fully set forth in the following specification, reference being had to the accompanying drawings.

The object of my invention is to furnish a cheap, convenient, and effective coupling for uniting the ends of rubber tubing or other flexible and pliant hose; and the invention consists in a tubular coupling of metal or other suitable material, whose ends are of such diameter as to admit of their easy entrance into the ends of the tubes to be united, while the body of the coupling is gradually increased in diameter from its ends toward the middle, and is encircled by a spiral thread formed thereon, as and for the purposes hereinafter specified.

Figure 1:
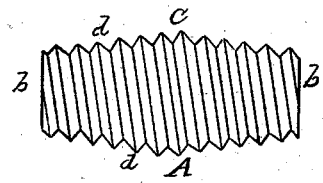
Figure 2:
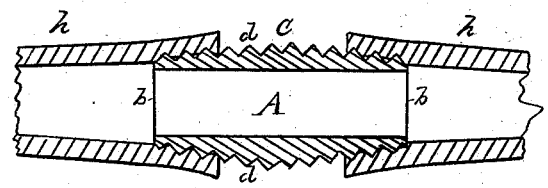

In the accompanying drawings, Figure 1 is a plan of my coupling. Fig. 2 is a longitudinal section of the same, and shown as entering two sections of hose.

The couplings are made of various sizes, corresponding to the different diameters of such tubes or hose.

The shell A is of uniform internal diameter, while from its ends $b\ b$ to the middle, C, it is gradually increased in thickness, or external diameter, as shown. The spiral thread $d\ d$, which is formed externally upon the shell, serves like a screw, when the coupling is turned into the ends of the hose $h\ h$ or the hose turned upon the coupling, to draw the ends of the hose together upon the enlarged part of the coupling, the inclined, tapering, or conical form of which, by its tendency to stretch and enlarge the hose, embeds its thread in the pliant substance thereof, and thus, while causing the ends of the hose to so approach each other, secures the joint thereby formed against both leakage and the liability to separation from linear strain, as such strain tends to contract the diameter of the hose and cause it to adhere still more firmly to the rough surface which such thread constitutes.

The coarse thread wrought, molded, or cast upon the coupling should be of a V shape, or rounded, substantially as shown, and run the entire length of the shell, and, for convenience of manipulation when uniting the tubes therewith, such thread should incline uniformly in one direction, as shown in Fig. 1.

A cheap and effective joint may be readily made either in joining lengths of new and perfect hose, or in repairing worn and leaky hose by cutting out the imperfect portion of the latter, and then uniting the ends of the remaining sound portions by means of said coupling in the manner specified.

I am aware of Letters Patent of the United States for hose-couplings numbered, respectively, 12,626, 181,714, 197,560, and 199,784, and I do not claim a coupling constructed as specified in either of said patents, the subject-matter of my invention being essentially different from that shown in either or all of said patents.

I claim—

A hose-coupling consisting of a shell, A, formed as shown, and provided with a spiral thread running its entire length, in manner and form and for the purpose specified.

OSBORN B. HALL, 2D.

Witnesses:
F. A. HALL,
EUGENE HUMPHREY.